United States Patent

Barnes

[15] 3,651,844
[45] Mar. 28, 1972

[54] ALL PURPOSE SAW

[72] Inventor: Terry B. C. Barnes, 31063 2nd Avenue, So. Laguna, Calif. 92677

[22] Filed: Feb. 24, 1970

[21] Appl. No.: 13,334

[52] U.S. Cl. .................................................145/31, 143/133 D
[51] Int. Cl. ....................................B27b 21/00, B27b 33/16
[58] Field of Search ........................143/133 AD, 133, 133 A; 145/31, 33, 108; 306/30; 279/99, 101; 287/125

[56] References Cited

UNITED STATES PATENTS 3,495,590   2/1970   Zeiller..............................143/133 H X Primary Examiner—Donald R. Schran
Attorney—Smyth, Roston & Pavitt

[57] ABSTRACT

An all purpose saw comprising an elongated saw blade having a generally helical cutting tooth, first and second gripping elements, and first and second connector members for attaching the first and second gripping elements, respectively, to the blade. At least one of the connector members at least partially circumscribes the blade and coacts with the helical tooth to attach such connector member to the blade.

8 Claims, 5 Drawing Figures

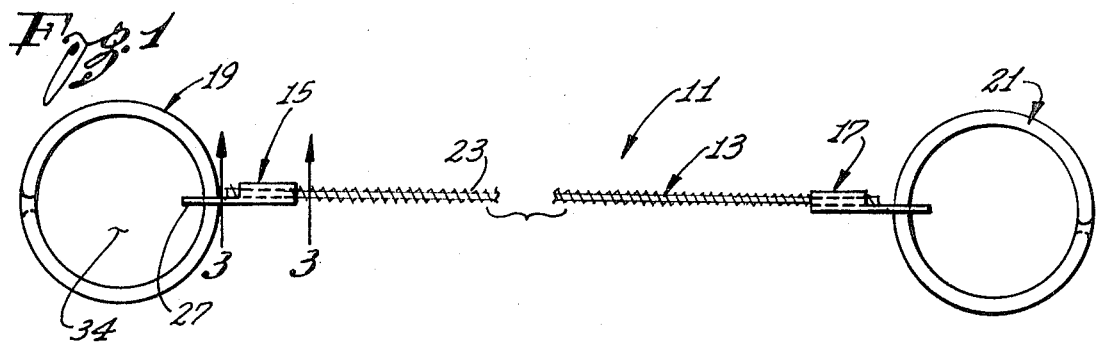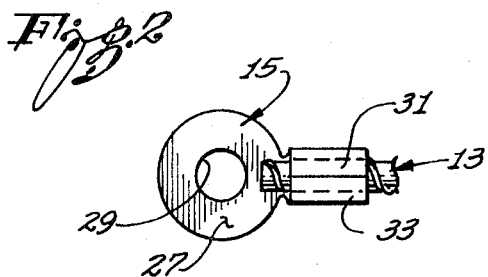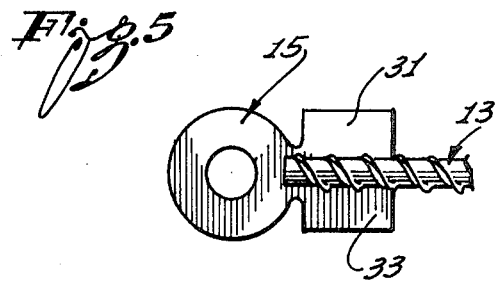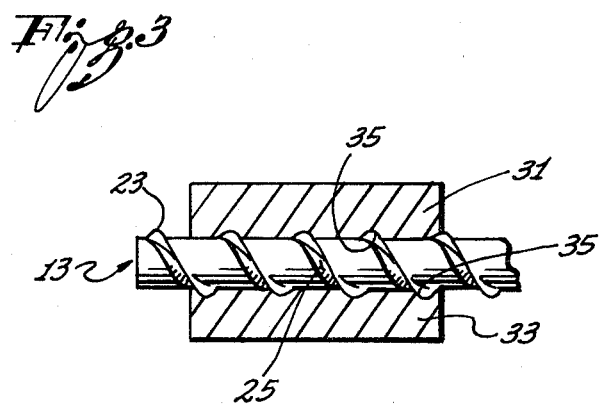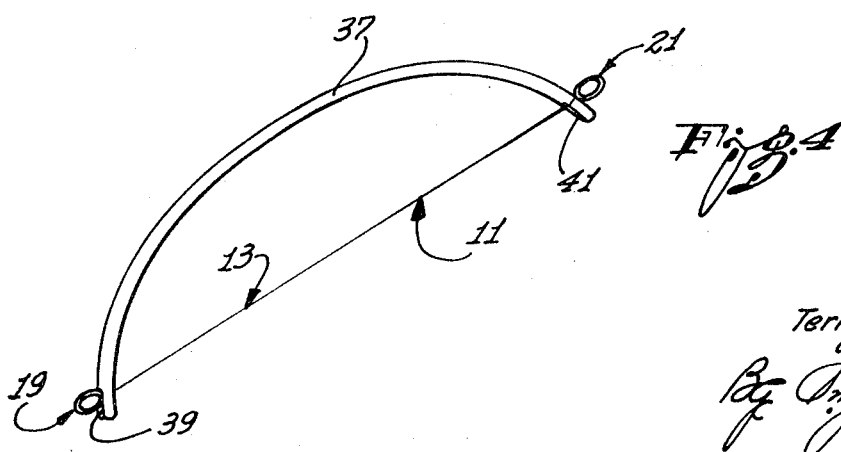

ALL PURPOSE SAW

BACKGROUND OF THE INVENTION

A survival saw typically includes a saw blade having gripping elements attached to the ends thereof. A saw of this type is lightweight and compact and is therefore well suited for camping and many other purposes.

Heretofore saws of this type have been subject to numerous severe limitations. For example, the saw blades of survival saws have been barbed or otherwise constructed so that they readily cause injury upon light contact with the user. This makes survival saws difficult and dangerous to use particularly for youth on camping trips.

Survival saw blades are generally not heavy, rugged elements and are, therefore, subject to breaking. When the blade breaks, the entire saw must be discarded as there is no feasible way to repair or replace the blades.

When using a saw to form an internal cut out in a member, it is necessary to first drill a starting hole in the member and then insert the saw blade through the hole. If a survival saw is to be used, the starting hole must be of very large diameter to permit one of the gripping elements of the saw to pass therethrough. If a coping saw is to be used, the hole can be of smaller diameter but the size of the U-shaped coping saw frame limits the distance which the drilled hole can lie inwardly of the periphery of the member.

SUMMARY OF THE INVENTION

The present invention provides an all purpose saw which is particularly adapted for use as a survival saw and which overcomes all of the above noted disadvantages. The saw blade is preferably attached to first and second independent gripping elements by first and second connector members.

To substantially reduce the likelihood of injury to the user, the present invention utilizes a saw blade having a helical cutting tooth. In addition, the helical tooth cuts many different materials such as wood, metal, plastics, horns and other materials. Because the tooth is helical, it can be used to cut first in one direction and then in a second direction without turning of the saw blade.

A feature of the present invention is to releasably attach at least one of the connector members to the saw blade. This permits the saw blade to be used to form an internal cut out without drilling a large diameter starting hole. With the present invention, the removable connector member is removed from the blade to allow the blade to be inserted through the small diameter starting hole, and then the gripping element is reattached for the sawing operation.

With the present invention, the connector member is releasably attached to the saw blade by coaction between the helical cutting tooth and a similar internal groove in the connector member. Preferably the connector member has an attachment portion which has an internal helical groove which generally conforms to the helical tooth. This, in effect, threadedly attaches the connector member to the saw blade, and this produces several advantages.

First, it releasably mounts the connector member and the gripping element on the saw blade with the consequent advantage relating to internal cut outs described hereinabove. Secondly, if the saw blade should break, it can be easily repaired by merely unscrewing the connector member from the shorter saw blade portion and then screwing such connector member on the free end of the longer saw blade portion. In this manner, the life of the saw blade is maximized. This is of particular significance when emergency operation of the saw is necessary such as may occur on camping trips. Furthermore, with demountable connector members and gripping elements, the entire saw blade can be replaced when necessary, and there is no need to discard the originally obtained gripping elements and connector members.

Thirdly, it eliminates the need to specially form or shape the end portions of the blade as has been necessary heretofore to provide for mounting of the blade. Thus, with the present invention the blade need only be cut to the desired length, and it is immediately ready for mounting without any work operations on the blade end portions. This latter advantage is applicable to any type of saw which can use a blade with a helical tooth such as a survival saw, coping saw, etc.

Preferably the saw blade is of generally flexible, resilient, wire-like construction, and for survival saw purposes, the gripping elements are independent elements, i.e., the gripping elements do not form a saw frame. Therefore, the blade can be resiliently deformed to provide substantial compactness. If the saw is to include a frame, the saw blade should be held in tension, and this can be advantageously accomplished, for example, by a resilient frame member extending between the ends of the saw blade.

Although various methods may be utilized to form the internal helical grooves on the connector members, this can most advantageously be carried out in a simple cold forming operation in which the cutting tooth forms the die. Specifically, the connector member may include an attachment portion which is forced into engagement with the cutting tooth to thereby permit the cutting tooth to displace the material of the attachment portion as necessary to form a helical groove therein generally conforming to the helical cutting tooth. If desired, the connector member and the saw blade can be relatively rotated to further form or perfect the internal groove on the attachment portion.

The invention, both as to its organization and method of operation together with further features and advantages thereof, may best be understood by reference to the following description taken in connection with the accompanying illustrative drawing.

BRIEF DESCRIPTION OF THE DRAWING

FIG. 1 is a side elevational view of an all purpose saw constructed in accordance with the teachings of this invention.

FIG. 2 is an enlarged plan view of one of the connector members mounted on the saw blade.

FIG. 3 is an axial sectional view taken generally along line 3—3 of FIG. 1 and showing one of the connector members with the saw blade therein.

FIG. 4 is a perspective view illustrating another use for the all purpose saw of this invention.

FIG. 5 is a plan view similar to FIG. 2 prior to the time that the connector member is deformed into interlocking engagement with the saw blade.

DESCRIPTION OF THE PREFERRED EMBODIMENT

FIG. 1 illustrates an all purpose saw 11 constructed in accordance with the teachings of this invention. Generally, the saw 11 includes a saw blade 13 having connector members or means 15 and 17 releasably attached to opposite end portions thereof. The saw 11 also includes gripping elements or means 19 and 21 which are attached to the connector members 15 and 17, respectively.

The saw blade 13 has a helical cutting tooth 23 extending along the length thereof. In the embodiment illustrated, the tooth 23 extends continuously for the full distance between the ends of the blade 13. In the embodiment illustrated, the saw blade 13 is a continuous wire element which is of relatively small diameter and which is sufficiently resiliently flexible to permit the blade to be resiliently deformed into one or more loops of several inches in diameter. The blade 13 is constructed of metal such as steel. The tooth 23 may be formed in any desired manner, such as by displacing metal from the wire to form a helical groove 25 (FIG. 3). For example, the blade 13 may be of the type disclosed in U.S. Pat. No. 2,514,609.

The connector members 15 and 17 in the embodiment illustrated are identical, and accordingly, only the connector member 15 is disclosed in detail. The connector member 15 includes a loop or eye portion 27 having an aperture 29 extending therethrough and clamping arms 31 and 33 forming an attachment or clamping portion of the connector member.

The clamping arms 31 and 33 circumscribe and clampingly engage a region of the blade 13 to thereby interconnect the blade and the container member 15.

The gripping element 19 is received in the aperture 29 to thereby interconnect the gripping element and the connector member 15. The gripping elements 19 and 21 are identical and are adapted to be manually grasped to permit manual reciprocation of the saw blade 13 to thereby perform a cutting operation. Although the gripping element 19 could be of various shapes, in the embodiment illustrated it is a ring-like element formed of a relatively stiff wire or similar material. The gripping element may be a conventional key ring of the type including two tightly wound wire coils which would readily permit the mounting of the eye portion 27 therein. Alternatively, the gripping element 19 may be a single axially split wire coil which is formed directly through the aperture 29. The gripping element 19 has a finger receiving opening 34 sized to accommodate the finger of a user.

The clamping arms 31 and 33 have an internal helical groove 35 (FIG. 3) formed on the inner surfaces thereof. The helical groove 35 generally conforms to the shape of the helical tooth 23 to thereby permit the connector member 15 to be rotated relative to the saw blade 13 with consequent relative axial movement resulting. Thus, the saw blade 13 serves, in effect, as a screw and the clamping arms 31 and 33 serve, in effect, as a nut adapted to cooperate with the screw.

This permits the connector members 15 and 17 to be quickly removed from, or mounted on, their respective end portions of the saw blade 13. In addition, should the saw blade 13 break, one of the connector members, for example, the connector member 15, could be unscrewed from the blade 13 and screwed onto the free end of the portion of the blade which is still attached to the connector member 17.

Another illustrative use of the saw 11 is shown in FIG. 4. As shown in FIG. 4, the saw 11 also includes a resilient, arcuate frame member 37 having notches 39 and 41 at the opposite ends thereof. The saw blade 13 is received in the notches 39 and 41 and the opposite ends of the frame member 37 bear against the gripping elements 19 and 31, respectively. The frame member 37 tends to straighten out but is prevented from doing so by the gripping elements 19 and 21 and the saw blade 13. When the saw is used as shown in FIG. 4, the function of the gripping elements 19 and 21 changes to a connecting function and the frame 37 becomes gripping means. In this manner, the resilient frame member 37 places the relatively flexible saw blade 13 in tension and provides for one handed use of the saw. The frame member 37 may be of any construction which will apply the necessary tension to the saw blade 13 and in the embodiment illustrated is constructed of a resilient wood.

Various methods can be utilized to form the internal helical groove 35. A preferred method is illustrated in FIGS. 2 and 5. The clamping arms 31 and 33 are initially open and may be flat as shown in FIG. 5. By forcing the clamping arms 31 and 33 from the open position shown in FIG. 5 to clamping position shown in FIG. 2, the clamping arms are caused to tightly bear against the tooth 23. This causes the relatively hard helical tooth 23 to forcibly displace some of the material of the clamping arms 31 and 33 to form the groove 35. Thus, the groove 35 is formed by cold flow of the material of the clamping arms 31 and 33 with the saw blade 13 serving as the forming die. If desired, the groove 35 may be further formed by relative rotation between the connector member 15 and the saw blade 13. Preferably the clamping arms 31 and 33 are constructed of a metal which is sufficiently soft to be subject to cold flow when subjected to the action of the helical tooth 23 described hereinabove.

Although exemplary embodiments of the invention have been shown and described, many changes, modifications, and substitutions may be made by one having ordinary skill in the art without necessarily departing from the spirit and scope of this invention.

I claim:

1. A saw comprising:
   an elongated saw blade, said blade having a generally helical cutting tooth and opposite end portions;
   gripping means adapted to be manually grasped to reciprocate said saw blade;
   first means for attaching said gripping means to a first region of said blade closely adjacent one of said end portions of said blade;
   second means for attaching said gripping means to a second region of said blade closely adjacent the other of said end portions whereby a user can grasp said gripping means and reciprocate said saw blade to perform a cutting operation;
   said helical tooth extending into said first region; and
   said first means having a helical groove, said first means at least partially circumscribing said first region with said helical groove receiving said helical tooth and coacting therewith to threadedly attach said gripping means to said blade, said first means and said blade being relatively rotatable to move the first means axially of the blade.

2. A saw as defined in claim 1 wherein said gripping means includes first and second manually grippable elements connectable to said first and second means, respectively.

3. A saw as defined in claim 1 wherein said gripping means includes a resilient frame member for placing the saw blade in tension.

4. A saw as defined in claim 1 wherein said first means includes a loop portion and said gripping means includes a ring-like element received within said loop to thereby attach said ring-like element to said first means.

5. A saw comprising:
   an elongated saw blade, said blade having a generally helical cutting tooth thereon, said blade having opposite end portions and said tooth extending into at least one of said end portions whereby said one end portion defines a screw portion;
   first and second gripping means for use in reciprocating the blade, each of said gripping means being adapted to be manually grasped;
   said first gripping means including a nut having an internal thread, said nut threadedly receiving said screw portion to thereby threadedly attach the first gripping means to said blade, said nut and screw portion being relatively rotatable to move the nut axially of the screw portion;
   means for attaching said second gripping means to a second region of said blade closely adjacent the other of said end portions whereby a user can grasp said gripping means and reciprocate said saw blade to perform a cutting operation; and
   said saw blade being relatively flexible to thereby permit substantial relative movement between said gripping means when said gripping means are attached to the saw blade.

6. A saw as defined in claim 5 wherein said nut and screw portion are relatively rotatable to permit removal of the first gripping means from said blade.

7. A saw as defined in claim 5 wherein said tooth extends substantially continuously along said blade.

8. A method of attaching a saw blade to members which are useful in reciprocating the saw blade, said method comprising:
   providing an elongated saw blade having a generally helical cutting tooth;
   providing a first member having an attachment portion of deformable material;
   positioning said attachment portion closely adjacent a first region of said blade, said helical cutting tooth defining a screw portion at least at said first region;
   forcing said attachment portion into engagement with said screw portion to displace some of the material of said attachment portion to form a groove in said attachment portion and convert the attachment portion into a nut with the nut and the screw portion being threadedly attached and being relatively rotatable to axially advance the nut relative to the screw portion; and
   attaching a second member to a second region of said blade, said member being useful in reciprocating the blade.